US012639450B2

(12) United States Patent
Barton et al.

(10) Patent No.: US 12,639,450 B2
(45) Date of Patent: May 26, 2026

(54) ENHANCEMENT OF MUD FILES BASED ON BEHAVIORAL ANALYSIS

(71) Applicant: Cisco Technology, Inc., San Jose, CA (US)

(72) Inventors: Robert Edgar Barton, Richmond (CA); Priyanka Bansal, Bangalore (IN); Rakesh B S, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 64 days.

(21) Appl. No.: 18/799,237

(22) Filed: Aug. 9, 2024

(65) Prior Publication Data

US 2026/0044607 A1 Feb. 12, 2026

(51) Int. Cl.
*G06F 21/57* (2013.01)
*H04L 9/40* (2022.01)

(52) U.S. Cl.
CPC ............ *G06F 21/577* (2013.01); *H04L 63/20* (2013.01)

(58) Field of Classification Search
CPC ............................... G06F 21/577; H04L 63/20
See application file for complete search history.

(56) References Cited

U.S. PATENT DOCUMENTS

| | | | |
|---|---|---|---|
| 2019/0253319 A1* | 8/2019 | Kampanakis | .......... G06N 5/025 |
| 2022/0086064 A1 | 3/2022 | Sivaraman et al. | |
| 2022/0360560 A1* | 11/2022 | Velugu | ................... G06N 20/00 |
| 2022/0417039 A1 | 12/2022 | Pan et al. | |
| 2023/0216860 A1 | 7/2023 | Kale et al. | |
| 2023/0353452 A1* | 11/2023 | Roscoe | ..................... G06F 8/65 |
| 2024/0211590 A1* | 6/2024 | Wuest | ................... G06F 21/577 |
| 2024/0348652 A1* | 10/2024 | Desigan | ................. H04L 63/20 |

\* cited by examiner

*Primary Examiner* — Henry Tsang
(74) *Attorney, Agent, or Firm* — Polsinelli P.C.

(57) ABSTRACT

The present technology monitors the behavior and security profile of an IoT device and determines the changes that need to be made to the MUD file of the IoT device based on the data gathered during the monitoring. The technology then creates a new MUD file using a generative model (such as a large language model (LLM)) and compares the new MUD file with the original MUD file. Thereafter, the technology can communicate with the IoT device manufacturer to provide the new MUD file and explain the reasons why it is advantageous over the original MUD file. The new MUD file can then be deployed by the manufacturer to resolve security and efficiency issues with ease.

20 Claims, 6 Drawing Sheets

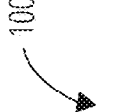
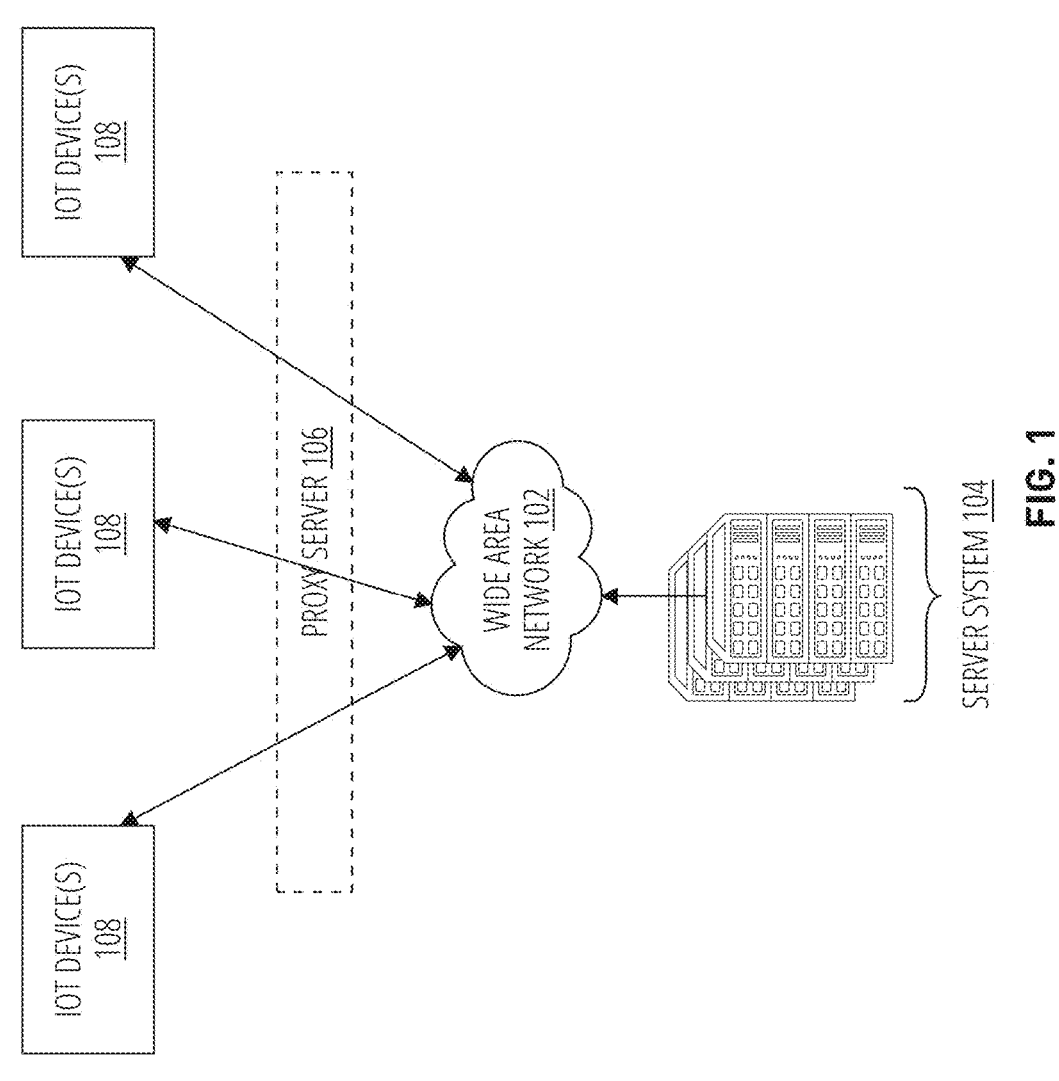
FIG. 1

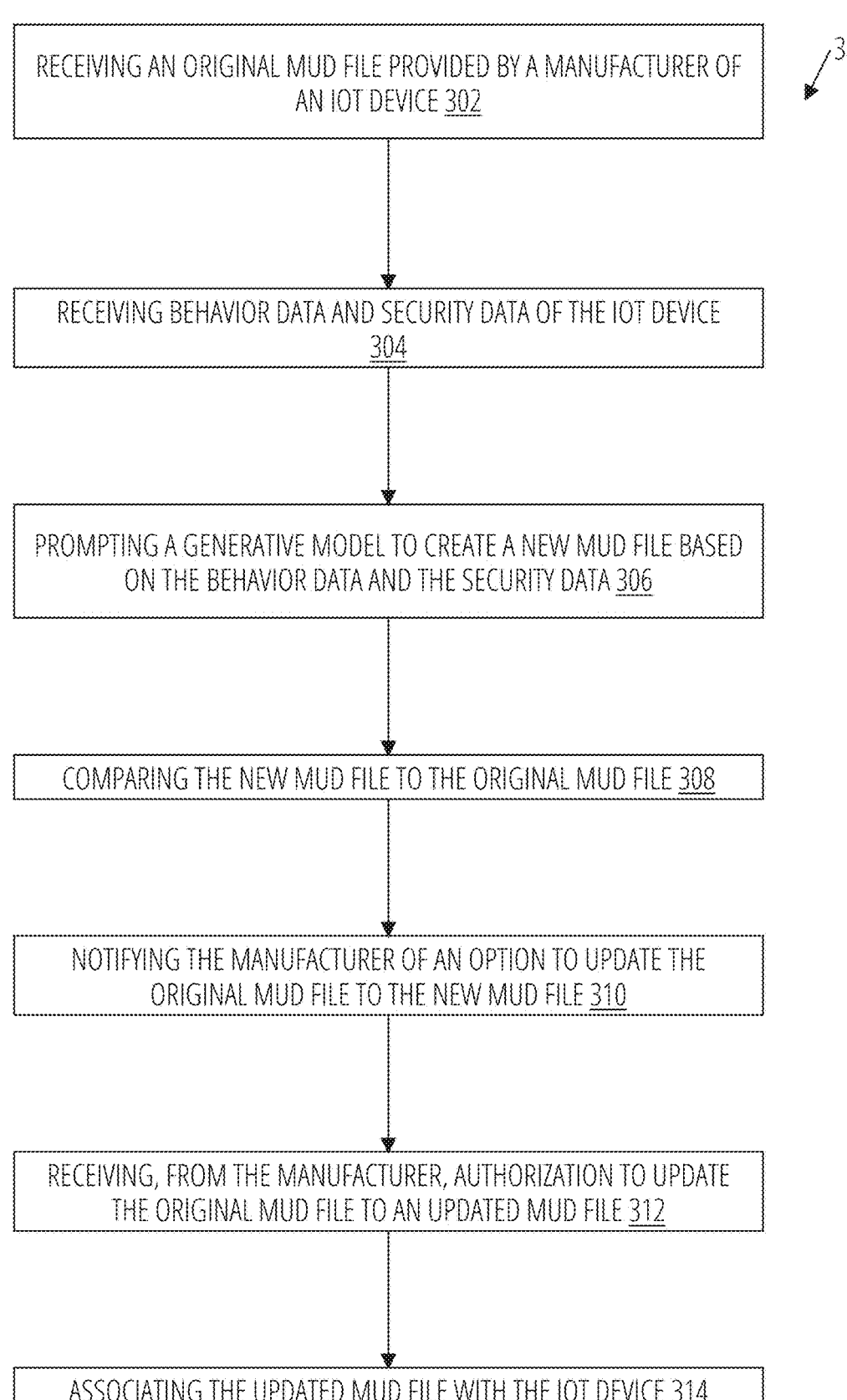

RECEIVING AN ORIGINAL MUD FILE PROVIDED BY A MANUFACTURER OF AN IOT DEVICE 302

RECEIVING BEHAVIOR DATA AND SECURITY DATA OF THE IOT DEVICE 304

PROMPTING A GENERATIVE MODEL TO CREATE A NEW MUD FILE BASED ON THE BEHAVIOR DATA AND THE SECURITY DATA 306

COMPARING THE NEW MUD FILE TO THE ORIGINAL MUD FILE 308

NOTIFYING THE MANUFACTURER OF AN OPTION TO UPDATE THE ORIGINAL MUD FILE TO THE NEW MUD FILE 310

RECEIVING, FROM THE MANUFACTURER, AUTHORIZATION TO UPDATE THE ORIGINAL MUD FILE TO AN UPDATED MUD FILE 312

ASSOCIATING THE UPDATED MUD FILE WITH THE IOT DEVICE 314

FIG. 3

ENCODE BLOCK <u>410a</u>

DECODE BLOCK <u>414a</u>

ENHANCEMENT OF MUD FILES BASED ON BEHAVIORAL ANALYSIS

BACKGROUND

The proliferation of Internet of Things (IoT) devices has led to an unprecedented increase in the volume of data generated and collected from various sensors and smart devices. These devices, ranging from home automation systems to industrial sensors, generate continuous streams of data that can be used for monitoring and controlling various applications.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 1 illustrates an IoT system in accordance with some embodiments of the present technology.

FIG. 3 illustrates a routine for receiving and using IoT device data in accordance with some embodiments of the present technology.

DETAILED DESCRIPTION

Figure 2:
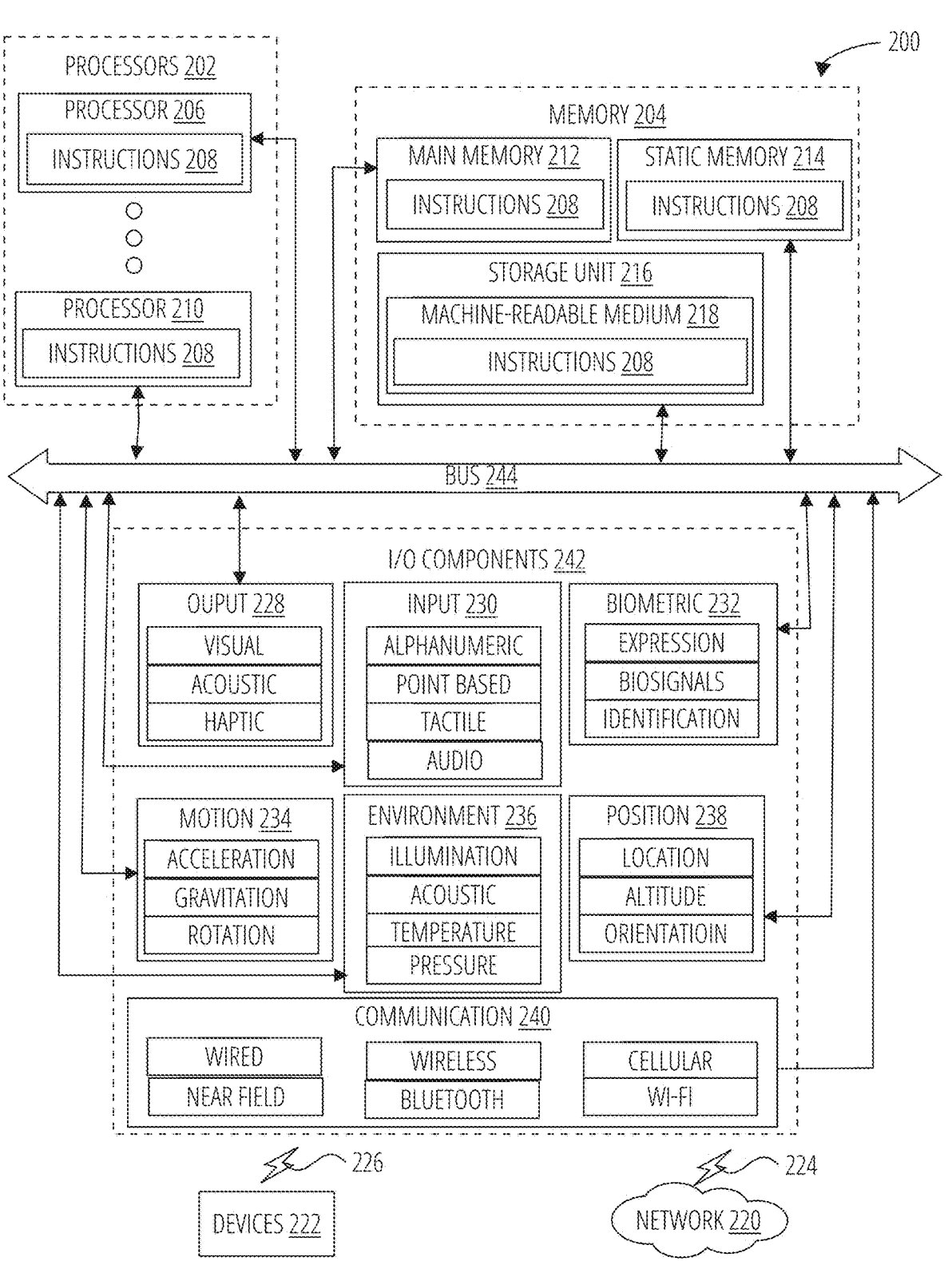
FIG. 2 illustrates a diagrammatic representation of an IoT device in the form of a computer system within which a set of instructions may be executed for causing the machine to perform any one or more of the IoT functionalities discussed herein, in accordance with some embodiments of the present technology.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

As the world changes, we are wise to change with it. In an era where technology evolves at an unprecedented pace, the ability to efficiently and securely update software has become an important consideration. IoT devices are no different and manufacturers are frequently tasked with updating Manufacturer Usage Description (MUD) files to ensure the IoT device is effectively deployed with adequate security and efficiency in mind.

A MUD file is a document created by device manufacturers that specifies the intended network behavior and communication requirements of an IoT device. It is used by network administrators to automatically configure and enforce security policies, ensuring that the device only engages in authorized network activities. Like all software and firmware, however, MUD files sometimes need to be updated. Several factors can necessitate a MUD file update, such as hardware changes (e.g., a new network interface is added or an existing one is removed), software updates (e.g., protocol changes, data changes, server changes), device functionality changes (e.g., if an IoT device that originally only monitored data now controls other devices in the network), response to vulnerability threats (e.g., restricting the IoT device to communicate only with certain trusted receivers), or policy changes (e.g., a new organization policy enforcing all devices to use a secure protocol).

The above typically represent external changes leading to MUD file updates. However, often the behavior of an IoT device can change depending on the characteristics of the network it has been deployed in. Or, the behavior may change based on the applications that communicate with the IoT device. Penetration testing or vulnerability scanning may discover a new vulnerability of the IoT device, leading to a need for improved security. A new or emerging threat may be known to others but not by the IoT device manufacturer, or perhaps the IoT manufacturer has not thought to update the MUD file to address the new threat. The reasons for updating a MUD file are seemingly endless and many of those reasons are either not known to the manufacturer or may be difficult for the manufacturer to monitor.

The present technology monitors the behavior and security profile of an IoT device and determines the changes that need to be made to the MUD file of the IoT device based on the data gathered during the monitoring. The technology then creates a new MUD file using a generative model (such as a large language model (LLM)) and compares the new MUD file with the original MUD file. Thereafter, the technology can communicate with the IoT device manufacturer to provide the new MUD file and explain the reasons why it is advantageous over the original MUD file. The new MUD file can then be deployed by the manufacturer to resolve security and efficiency issues with case.

Overview

The presently disclosed embodiments include a method including receiving an original manufacturer usage description file (original MUD file) provided by a manufacturer of an internet-of-things device (IoT device), receiving behavior data and security data of the IoT device, prompting a generative model to create a new MUD file based on the behavior data and the security data, comparing the new MUD file to the original MUD file, notifying the manufacturer of an option to update the original MUD file to the new MUD file, receiving, from the manufacturer, authorization to update the original MUD file to an updated MUD file, and associating the updated MUD file with the IoT device.

The presently disclosed embodiments also include a network controller including a storage configured to store instructions, and at least one processor configured to execute the instructions. The instructions cause the at least one processor to receive an original MUD file provided by a manufacturer of an IoT device, receive behavior data and security data of the IoT device, prompt a generative model to create a new MUD file based on the behavior data and the security data, compare the new MUD file to the original MUD file, notify the manufacturer of an option to update the original MUD file to the new MUD file, receive, from the manufacturer, authorization to update the original MUD file to an updated MUD file, and associate the updated MUD file with the IoT device.

The presently disclosed embodiments further include a non-transitory computer-readable storage medium including instructions that, when executed by at least one processor, cause the at least one processor to perform various steps. For example, the at least one processor can receive an original MUD file provided by a manufacturer of an IoT device, receive behavior data and security data of the IoT device, prompt a generative model to create a new MUD file based on the behavior data and the security data, compare the new MUD file to the original MUD file, notify the manufacturer of an option to update the original MUD file to the new MUD file, receive, from the manufacturer, authorization to update the original MUD file to an updated MUD file, and associate the updated MUD file with the IoT device.

Example Embodiments

FIG. 1 illustrates an IoT system 100 according to at least one of the presently disclosed embodiments. The IoT system 100 can include IoT device(s) 108 communicatively coupled via a wide area network 102 to a server system 104. The IoT device(s) 108 can be any device capable of communicating with another device (including others of the IoT device(s) 108) through the internet. For example, the IoT device(s) 108 can include smart thermostats, wearable health monitors, smart locks, and connected appliances like refrigerators and washing machines, for example. Additionally, the server system 104 may utilize cloud computing resources to manage data storage and computational tasks and improve scalability and security for the entire IoT system 100.

The network topology of the IoT system 100 is shown as a hub-and-spoke topology. For example, the IoT device(s) 108 may be communicably coupled via a proxy server 106. In this configuration, the IoT device(s) 108 have a 1:1 communication channel to the server system 104 and communicate with each other, if at all, via the server system 104. The proxy server 106 may improve the performance of the IoT system 100 by mirroring some or all of the state of the server system 104 and thus enabling the IoT device(s) 108 to communicate without creating bandwidth or incurring the latency of the wide area network 102. The proxy server 106 can be located at a facility or a nearby facility to where the IoT device(s) 108 are located.

Other topologies can be implemented without departing from the spirit and scope of the present disclosure. For example, the IoT system 100 can be configured using a mesh topology where each of the IoT device(s) 108 acts as a node that can directly communicate with multiple other nodes, creating a network with no single point of failure. This approach enhances network resilience and enables more efficient data distribution among the IoT device(s) 108. Alternatively, a peer-to-peer (P2P) communication can be enabled, allowing the IoT device(s) to interact directly without needing to pass through the proxy server 106 or the server system 104. This topology can further reduce latency and enhance real-time data processing capabilities. Each topology offers distinct advantages and can be selected based on specific requirements such as scale, security, complexity, and criticality of the IoT applications deployed within the IoT system 100.

FIG. 2 illustrates a diagrammatic representation of an IoT device 200 in the form of a computer system within which a set of instructions may be executed for causing the IoT device 200 to perform any one or more of the methodologies discussed herein, according to an example embodiment. The IoT device 200 shown in FIG. 2 can be, for example, any of the IoT device(s) 108 illustrated in FIG. 1. FIG. 2 shows a diagrammatic representation of the IoT device 200 in the example form of a computer system, within which instructions 208 (e.g., software, a program, an application, an applet, an app, or other executable code) for causing the IoT device 200 to perform any one or more of the methodologies discussed herein may be executed.

The instructions 208 transform the general, non-programmed IoT device 200 into a particular IoT device 200 programmed to carry out the described and illustrated functions in the manner described. In alternative embodiments, the IoT device 200 operates as a standalone device or may be coupled (e.g., networked) to other machines. In a networked deployment, the IoT device 200 may operate in the capacity of a server machine or a client machine in a server-client network environment, or as a peer machine in a peer-to-peer (or distributed) network environment. The IoT device 200 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), a security camera, other smart devices, a web appliance, a network router, a network switch, a network bridge, or any machine capable of executing the instructions 208, sequentially or otherwise, that specify actions to be taken by the IoT device 200.

Further, while only a single IoT device 200 is illustrated, the term "machine" shall also be taken to include a collection of machines that individually or jointly execute the instructions 208 to perform any one or more of the methodologies discussed herein.

The IoT device 200 may include processors 202, memory 204, and I/O components 242, which may be configured to communicate with each other such as via a bus 244. In an example embodiment, the processors 202 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 206 and a processor 210 that may execute the instructions 208. The term "processor" is intended to include multi-core processors that may comprise two or more independent processors (sometimes referred to as "cores") that may execute instructions contemporaneously. Although FIG. 2 shows multiple processors 202, the IoT device 200 may include a single processor with a single core, a single processor with multiple cores (e.g., a multi-core processor), multiple processors with a single core, multiple processors with multiples cores, or any combination thereof.

The memory 204 may include a main memory 212, a static memory 214, and a storage unit 216, both accessible to the processors 202 such as via the bus 244. The main memory 204, the static memory 214, and storage unit 216 store the instructions 208 embodying any one or more of the methodologies or functions described herein. The instructions 208 may also reside, completely or partially, within the main memory 212, within the static memory 214, within machine-readable medium 218 within the storage unit 216, within at least one of the processors 202 (e.g., within the processor's cache memory), or any suitable combination thereof, during execution thereof by the IoT device 200.

The I/O components 242 may include a wide variety of components to receive input, provide output, produce output, transmit information, exchange information, capture measurements, and so on. The specific I/O components 242 that are included in a particular machine will depend on the type of machine. For example, portable machines such as mobile phones will likely include a touch input device or other such input mechanisms, while a headless server machine will likely not include such a touch input device. It will be appreciated that the I/O components 242 may include many other components that are not shown in FIG. 2. The I/O components 242 are grouped according to functionality merely for simplifying the following discussion and the grouping is in no way limiting. In various example embodiments, the I/O components 242 may include output components 228 and input components 230. The output components 228 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 230 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 242 may include biometric components 232, motion components 234, environmental components 236, or position components 238, among a wide array of other components. For example, the biometric components 232 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 234 may include acceleration sensor components (e.g., accelerometer), gravitation sensor components, rotation sensor components (e.g., gyroscope), and so forth. The environmental components 236 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 238 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 242 may include communication components 240 operable to couple the IoT device 200 to a network 220 or devices 222 via a coupling 224 and a coupling 226, respectively. For example, the communication components 240 may include a network interface component or another suitable device to interface with the network 220. In further examples, the communication components 240 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 222 may be another machine or any of a wide variety of peripheral devices (e.g., a peripheral device coupled via a USB).

Moreover, the communication components 240 may detect identifiers or include components operable to detect identifiers. For example, the communication components 240 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 240, such as location via Internet Protocol (IP) geolocation, location via Wi-Fi® signal triangulation, location via detecting an NFC beacon signal that may indicate a particular location, and so forth.

The various memories (i.e., memory 204, main memory 212, static memory 214, and/or memory of the processors 202) and/or storage unit 216 may store one or more sets of instructions and data structures (e.g., software) embodying or utilized by any one or more of the methodologies or functions described herein. These instructions (e.g., the instructions 208), when executed by processors 202, cause various operations to implement the disclosed embodiments.

FIG. 3 illustrates an example method 300 for creating and associating a new or updated MUD file with an IoT device. Although the example method depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

According to some examples, the method 300 includes receiving an original MUD file provided by a manufacturer of an IoT device at block 302. For example, the server system 104 illustrated in FIG. 1 or a network controller associated with the server system 104 may receive an original MUD file provided by a manufacturer of an IoT device, e.g., one of the IoT devices 108 described in FIG. 1 or the IoT device 200 in FIG. 2 (for case of reference, these devices will be referred to as an "IoT device"). Typically, but not always, the original MUD file will be the file associated with the IoT device when the IoT device was deployed onto the network associated with the method 300. This MUD file contains a set of device-specific policies that define the communication behaviors and access permissions of the IoT device. These policies are uploaded to the network's management system to ensure the device operates securely and in accordance with network protocols.

According to some examples, the method 300 includes receiving behavior data and security data of the IoT device at block 304. For example, the server system 104 illustrated in FIG. 1 or a network controller associated with the server system 104 may receive behavior data and security data of the IoT device. The server system 104 may receive such data through monitoring or observation of the IoT device, or in any other manner. For example, this data could be collected via continuous network traffic analysis, where the server system monitors incoming and outgoing packets to identify any anomalies or deviations from expected behavior. Additionally, the IoT device itself might periodically send diagnostic reports or alerts directly to the server system 104, providing real-time updates on its status and potential security threats.

The behavior data and security data can be any data relevant to the updating, revising, or augmentation of the MUD file for the IoT device. In some embodiments, the behavior data includes data sent or received by the IoT device, protocols used by the IoT device, and ports accessed by the IoT device. For example, this data can include detailed logs of network traffic, such as packet size, frequency, and destination Internet Protocol (IP) addresses, as well as the types of protocols (for example, Hypertext Transfer Protocol (HTTP), Message Queuing Telemetry Transport (MQTT), or Constrained Application Protocol (CoAP)) employed during communication. The security data can include reports provided based on penetration testing or vulnerability scanning. For example, this data can include identified vulnerabilities like unpatched firmware, potential backdoors, or weak authentication mechanisms, as well as the results from simulated attack scenarios that test the device's resilience against common threats such as denial-of-service attacks, man-in-the-middle attacks, and unauthorized access attempts. The security data can further include network analytics and flow logs, for example, along with reports from security systems that have collected behavioral data about the IoT device. Using this data, a complete security profile of the device is learned and is stored in a file, in some embodiments. This file can include which ports the device communicates on, what applications and other peers it communicates with, open ports on the device, and so forth. The profile can be dynamic and can be updated over time as more information is learned.

According to some examples, the method 300 includes prompting a generative model to create a new MUD file based on the behavior data and the security data at block 306. For example, the server system 104 or a network controller associated with the server system 104 illustrated in FIG. 1 may prompt a generative model to create a new MUD file based on the behavior data and the security data. The generative model may be, but is not limited to, a large language model (LLM). Other forms of generative models may include generative adversarial networks (GANs), Generative Pre-trained Transformers (GPTs), variational auto-encoders (VAEs), and recurrent neural networks (RNNs).

Various factors may necessitate the revision of the original MUD file. These factors include, but are not limited to, hardware changes (e.g., a new network interface is added or an existing one is removed), software updates (e.g., protocol changes, data changes, server changes), device functionality changes (e.g., if an IoT device that originally only monitored data now controls other devices in the network), response to vulnerability threats (e.g., restricting the IoT device to communicate only with certain trusted receivers), or policy changes (e.g., a new organization policy enforcing all devices to use a secure protocol). Further, the above factors consider only external changes leading to MUD file updates. However, the behavior of an IoT device can change depending on the characteristics of the network it has been deployed in, and applications that communicate with the IoT device. Each of these factors, and any other factor, may provide the basis for the updating of the MUD file.

The method 300 may also include training the generative model with training files that are the same format as the file, for example but without limitation, MUD files. These training files provide the generative model with examples that it can learn from, enabling it to understand the structure, attributes, and typical data patterns associated with IoT devices. For example, the training process may involve using historical data from similar IoT devices. In some embodiments, the training files can include MUD files associated with IoT device. In some embodiments, the training files can include configuration files associated with an IoT dashboard. By providing these training files, the generative model can learn relationships regarding what is generally included in these training files and how data in these training files are generally formatted.

The training of the generative model can also include a fine-tuning phase. In the fine-tuning training phase, log data or TCP dump data from an IoT device can be provided to the generative model and the generative model can be asked to create a MUD file or configuration file from the log data or TCP dump data. This data can include sensor readings, device status logs, data transmission data such as ports and IP addresses, and operational parameters. The output of the generative model can then be compared to a MUD file or configuration file for the device that generated the log data or TCP dump data. When the output of the generative model is close to the historical MUD file or configuration file, the generative model can be rewarded, and when the output is lacking, the generative model can be encouraged to learn to be better at producing the MUD file or configuration file.

According to some examples, the method 300 includes comparing the new Manufacturer Usage Description (MUD) file to the original MUD file at block 308. For example, the server system 104 illustrated in FIG. 1 or a network controller associated with the server system 104 may compare the new MUD file to the original MUD file. This comparison can be done in any manner, for example, using a simple script or a more robust generative model such as, but not limited to, an LLM. This comparison can also be performed by leveraging automated tools that analyze differences in network behavior policies, identifying any discrepancies or deviations in device communication patterns and access permissions. The comparison may also be performed by software designed to compare the text of two documents and output a comparison document or annotations to the original or revised document illustrating these changes. Examples of such software include, but are not limited to, diff tools like Git diff, automated configuration management tools like Ansible®, and specialized text comparison software like Beyond Compare® and WinMerge®.

According to some examples, the method 300 includes notifying the manufacturer of an option to update the original MUD file to the new MUD file at block 310. For example, the server system 104 illustrated in FIG. 1 or a network controller associated with the server system 104 may notify the manufacturer of an option to update the original MUD file to the new MUD file. This notification can occur in any manner, for example, by sending an automated email alert, generating a system notification on the manufacturer's management console, or through an application programming interface (API) call that integrates with the manufacturer's existing update management system. The notification may include details about the detected changes, the reasons for the suggested update, and the potential impact on device security and performance. For example, the new MUD file may include annotations identifying changes between the original MUD file and the new MUD file, or explanations for why the changes were made to the original MUD file. In particular, the new MUD file may include enhanced security policies to address newly discovered vulnerabilities, updated protocol usage guidelines to improve efficiency, or additional access control measures to better regulate device communications. The explanations and annotations can be communicated in any manner.

According to some examples, the method 300 includes receiving, from the manufacturer, authorization to update the original MUD file to an updated MUD file at block 312. For example, the server system 104 illustrated in FIG. 1 or a network controller associated with the server system 104 may receive, from the manufacturer, authorization to update the original MUD file to an updated MUD file.

Here, the term "updated MUD file" can be, but is not necessarily limited to, the new MUD file created by the method. For example, the manufacturer may receive a communication from the method 300 indicating that the original MUD file needs to be updated in some manner. This communication may include annotations or reasons for the changes, as discussed above. However, the manufacturer may then decide to create its own MUD file based on this newly created MUD file, perhaps inspired by the vulnerabilities or inefficiencies addressed in the new MUD file. In doing so, the manufacturer has now created an updated MUD file that is not the same as the new MUD file. However, both this manufacturer-created updated MUD file and the new MUD file created by the method 300 can constitute an "updated MUD file" consistent with the present disclosure.

According to some examples, the method 300 includes associating the updated MUD file with the IoT device at block 314. For example, the server system 104 illustrated in FIG. 1 or a network controller associated with the server system 104 may associate the updated MUD file with the IoT device. In doing so, the network controller may implement a new MUD policy for the IoT device to address the communication permissions of the IoT device or any other efficiency or security concerns that are addressed by the updated MUD file.

The manufacturer may now want to update the MUD file for other IoT devices operating on any network. For this, the method 300 further contemplates associating the updated MUD file with additional IoT devices that are identified in the updated MUD file as being associated with the updated MUD file. For example, the updated MUD file may identify devices within the file itself or be linked to a centralized database that maps specific IoT device models to their corresponding MUD files. This allows for seamless and automated deployment of the updated policies across similar devices within the network, promoting consistency in security and operational behavior. The method 300 may also include mechanisms for broadcasting the update to all relevant devices, using network management tools to push the updated MUD file to each device, and verifying successful updates through post-deployment monitoring and validation checks.

In some embodiments, the method 300 involves determining the security data represents a security threat and quarantining the IoT device until the original MUD file is updated to address the security threat. For example, the security data received by the network controller may indicate an abnormally large security threat that the method 300 requires to be remediated before the IoT device may reenter the network. In particular, this could involve detecting malware activity, unauthorized access attempts, or significant deviations from expected communication patterns that suggest the device has been compromised. During the quarantine period, the IoT device is isolated from the rest of the network to prevent any potential spread of the threat. The manufacturer or network administrator must then update the MUD file to include new security policies or patches that mitigate the identified threat. Once the MUD file is updated and verified to address the security concerns, the IoT device can be safely reintegrated into the network.

Figure 4A:
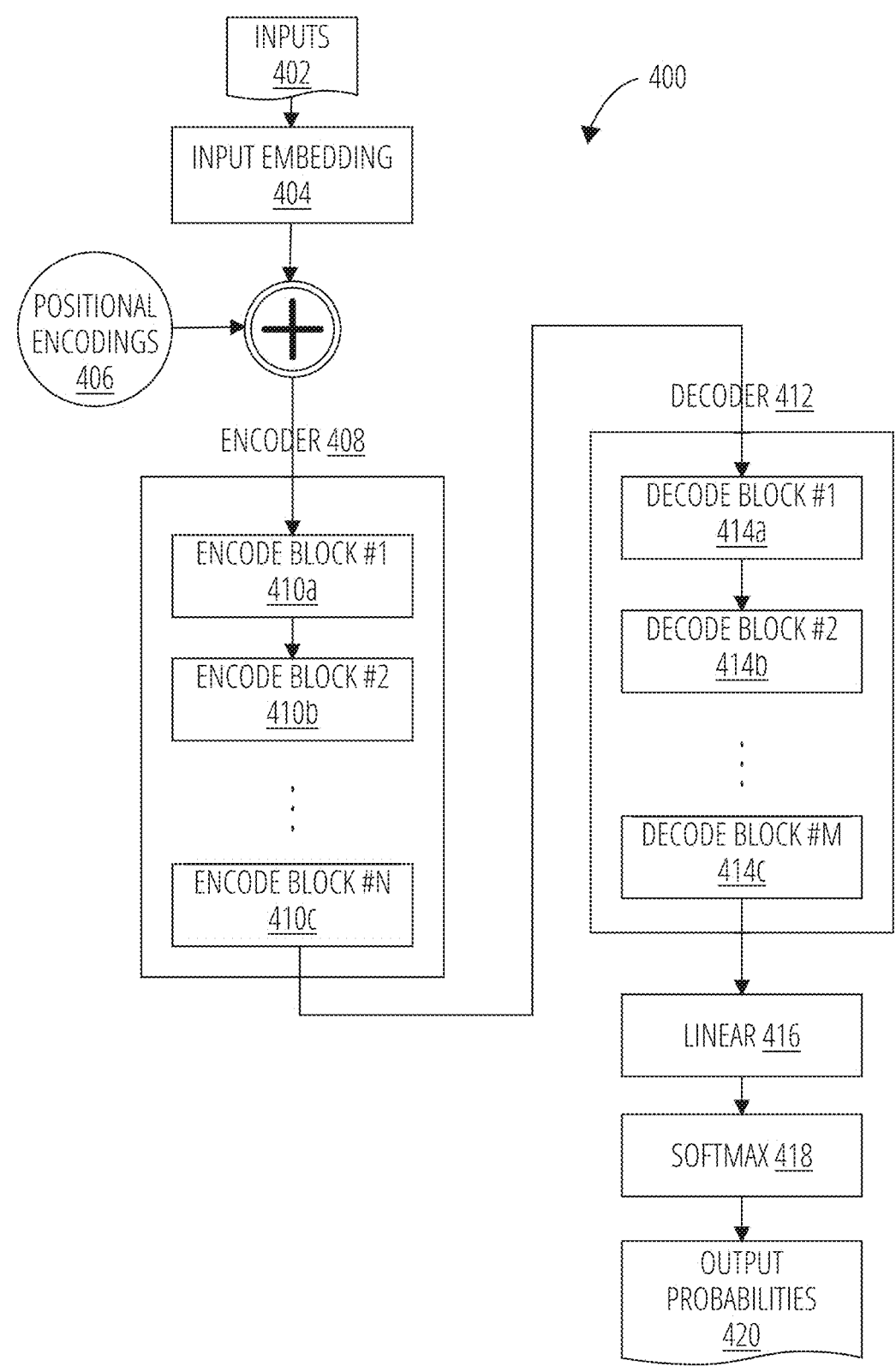
FIG. 4A illustrates a block diagram for an example of a transformer neural network architecture in accordance with some embodiments of the present technology.

FIG. 4A illustrates a block diagram for an example of a transformer neural network architecture, in accordance with certain embodiments. A transformer architecture 400 can be used by a prompt generator, such as a Generative Pre-trained Transformer (GPT) model. Additionally or alternatively, the prompt generator can include a Bidirectional Encoder Representations from Transformers (BERT) model. According to certain non-limiting examples, the transformer architecture 400 is illustrated in FIG. 4A through FIG. 4C as including inputs 402, an input embedding block 404, positional encodings 406, an encoder 408 (e.g., encode blocks 410a, 410b, and 410c), a decoder 412 (e.g., decode blocks 414a, 414b, and 414c), a linear block 416, a softmax block 418, and output probabilities 420.

The input embedding block 404 is used to provide representations for words. For example, embedding can be used in text analysis. According to certain non-limiting examples, the representation is a real-valued vector that encodes the meaning of the word in such a way that words that are closer in the vector space are expected to be similar in meaning. Word embeddings can be obtained using language modeling and feature learning techniques, where words or phrases from the vocabulary are mapped to vectors of real numbers. According to certain non-limiting examples, the input embedding block 404 can be learned embeddings to convert the input tokens and output tokens to vectors of dimension that have the same dimension as the positional encodings, for example.

The positional encodings 406 provide information about the relative or absolute position of the tokens in the sequence. According to certain non-limiting examples, the positional encodings 406 can be provided by adding positional encodings to the input embeddings at the inputs to the encoder 408 and decoder 412. The positional encodings have the same dimension as the embeddings, thereby enabling a summing of the embeddings with the positional encodings. There are several ways to realize the positional encodings, including learned and fixed. For example, sine and cosine functions having different frequencies can be used. That is, each dimension of the positional encoding corresponds to a sinusoid. Other techniques of conveying positional information can also be used, as would be understood by a person of ordinary skill in the art. For example, learned positional embeddings can instead be used to obtain similar results. An advantage of using sinusoidal positional encodings rather than learned positional encodings is that so doing allows the model to extrapolate to sequence lengths longer than the ones encountered during training.

Figure 4B:
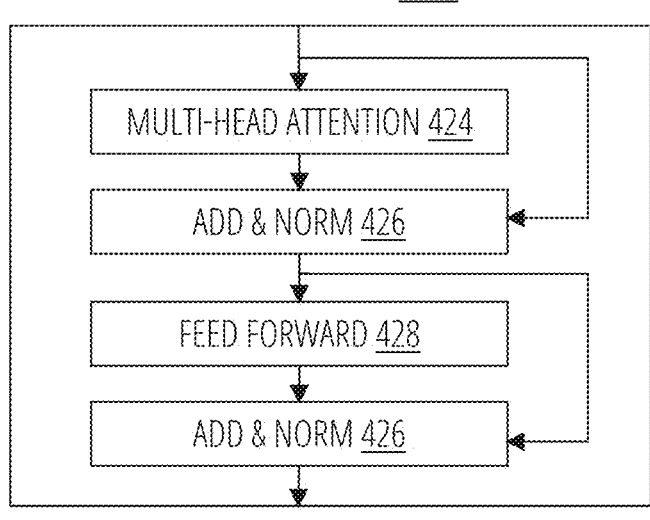
FIG. 4B illustrates a block diagram for an example of an encoder of the transformer neural network architecture in accordance with some embodiments of the present technology.
Figure 4C:
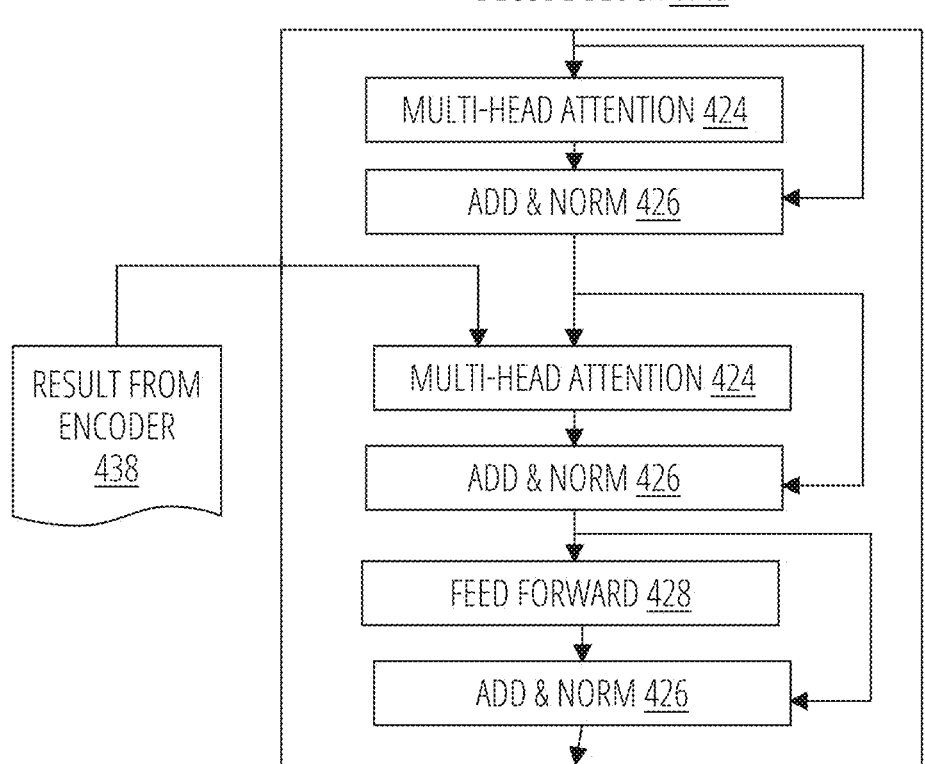
FIG. 4C illustrates a block diagram for an example of a decoder of the transformer neural network architecture in accordance with some embodiments of the present technology.

FIG. 4B illustrates a block diagram for an example of an encoder of the transformer neural network architecture, in accordance with certain embodiments.

The encoder 408 uses stacked self-attention and point-wise, fully connected layers. The encoder 408 can be a stack of N identical layers (e.g., N=6), and each layer is an encode block, as illustrated by encode block 410*a* shown in FIG. 4B. Each encode block 410*a*-410*c* has two sub-layers: (i) a first sub-layer has a multi-head attention block 424 and (ii) a second sub-layer has a feed forward block 428, which can be a position-wise fully connected feed-forward network. The feed forward block 428 can use a rectified linear unit (ReLU). Result(s) from the encoder can be input into the multi-head attention block 424, as shown by the results from encoder block result from encoder 438.

The encoder 408 uses a residual connection around each of the two sub-layers, followed by an add & norm block 426, which performs normalization (e.g., the output of each sub-layer is LayerNorm (x+Sublayer (x)), i.e., the product of a layer normalization "LayerNorm" time the sum of the input "x" and output "Sublayer (x)" pf the sublayer Layer-Norm (x+Sublayer (x)), where Sublayer (x) is the function implemented by the sub-layer). To facilitate these residual connections, all sub-layers in the model, as well as the embedding layers, produce output data having a same dimension.

FIG. 4C illustrates a block diagram for an example of a decoder of the transformer neural network architecture, in accordance with certain embodiments.

Similar to encoder 408, decoder 412 uses stacked self-attention and point-wise, fully connected layers. The decoder 412 can also be a stack of M identical layers (e.g., M=6), and each layer is a decode block, as illustrated by decode block 414*a* shown in FIG. 4C. In addition to the two sub-layers (i.e., the sublayer with the multi-head attention block 424 and the sub-layer with the feed-forward block) found in the encode block 410*a*, the decode block 414*a* can include a third sub-layer, which performs multi-head attention over the output of the encoder stack. Similar to the encoder 408, the decoder 412 uses residual connections around each of the sub-layers, followed by layer normalization. Additionally, the sub-layer with the multi-head attention block 424 can be modified in the decoder stack to prevent positions from attending to subsequent positions. This masking, combined with the fact that the output embeddings are offset by one position, ensures that the predictions for position 'i' can depend only on the known output data at positions less than i.

The linear block 416 can be a learned linear transformation. For example, when the transformer architecture 400 is being used to translate from a first language into a second language, the linear block 416 projects the output from the last decode block 414*c* into word scores for the second language (e.g., a score value for each unique word in the target vocabulary) at each position in the sentence. For instance, if the output sentence has seven words and the provided vocabulary for the second language has 10,000 unique words, then 10,000 score values are generated for each of those seven words. The score values indicate the likelihood of occurrence for each word in the vocabulary in that position of the sentence.

The softmax block 418 then turns the scores from the linear block 416 into output probabilities 420 (which add up to 1.0). In each position, the index provides for the word with the highest probability, and then map that index to the corresponding word in the vocabulary. Those words then form the output sequence of the transformer architecture 400. The softmax operation is applied to the output from the linear block 416 to convert the raw numbers into the output probabilities 420 (e.g., token probabilities), which are used in the process of generating a summary based on the prompt generator, generating a policy.

Figure 5:
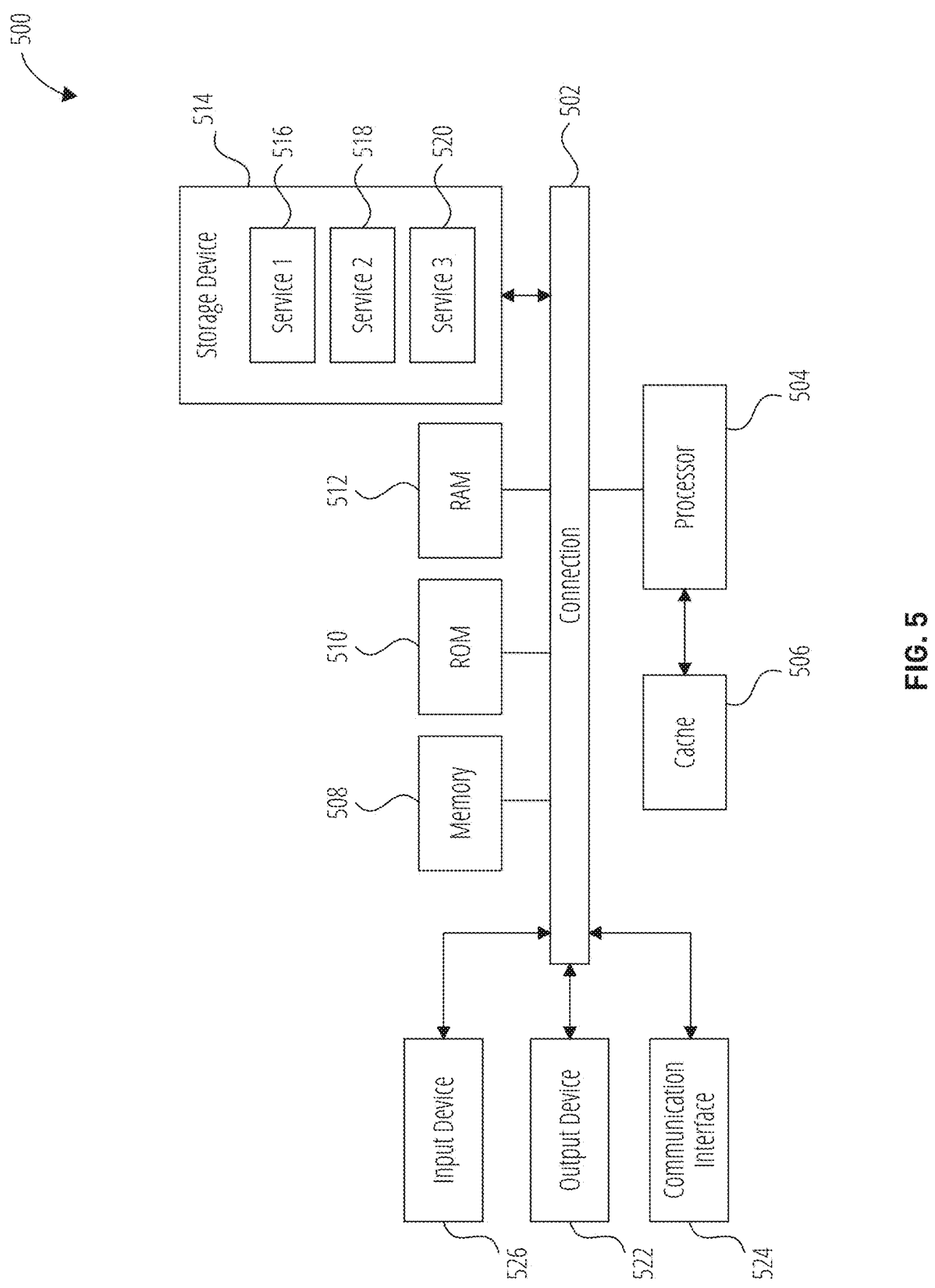
FIG. 5 shows an example of a system for implementing certain aspects of the present technology.

FIG. 5 shows an example of computing system 500, which can be for example any computing device making up the server system 104, the IoT device(s) 108, proxy server 106, or any component thereof in which the components of the system are in communication with each other using connection 502. Connection 502 can be a physical connection via a bus, or a direct connection into processor 504, such as in a chipset architecture. Connection 502 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 500 includes at least one processing unit (CPU or processor) 504 and connection 502 that couples various system components including system memory 508, such as read-only memory (ROM) 510 and random access memory (RAM) 512 to processor 504. Computing system 500 can include a cache of high-speed memory 506 connected directly with, in close proximity to, or integrated as part of processor 504.

Processor 504 can include any general purpose processor and a hardware service or software service, such as services 516, 518, and 520 stored in storage device 514, configured to control processor 504 as well as a special-purpose processor where software instructions are incorporated into the actual processor design. Processor 504 may essentially be a completely self-contained computing system, containing multiple cores or processors, a bus, memory controller, cache, etc. A multi-core processor may be symmetric or asymmetric.

To enable user interaction, computing system 500 includes an input device 526, which can represent any number of input mechanisms, such as a microphone for speech, a touch-sensitive screen for gesture or graphical input, keyboard, mouse, motion input, speech, etc. Computing system 500 can also include output device 522, which can be one or more of a number of output mechanisms known to those of skill in the art. In some instances, multimodal systems can enable a user to provide multiple types of input/output to communicate with computing system 500. Computing system 500 can include communication interface 524, which can generally govern and manage the user input and system output. There is no restriction on operating on any particular hardware arrangement, and therefore the basic features here may easily be substituted for improved hardware or firmware arrangements as they are developed.

Storage device 514 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 514 can include software services, servers, services, etc., that when the code that defines such software is executed by the processor 504, it causes the system to perform a function. In some embodiments, a hardware service that performs a particular function can include the software component stored in a computer-readable medium in connection with the necessary hardware components, such as processor 504, connection 502, output device 522, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Aspect 1. A method comprising receiving an original manufacturer usage description file (original MUD file) provided by a manufacturer of an internet-of-things device (IoT device); receiving behavior data and security data of the IoT device; prompting a generative model to create a new MUD file based on the behavior data and the security data; comparing the new MUD file to the original MUD file; notifying the manufacturer of an option to update the original MUD file to the new MUD file; receiving, from the manufacturer, authorization to update the original MUD file to an updated MUD file; and associating the updated MUD file with the IoT device.

Aspect 2. The method of Aspect 1, wherein the behavior data includes data sent or received by the IoT device, protocols used by the IoT device, and ports accessed by the IoT device.

Aspect 3. The method of Aspect 1, wherein the security data includes reports provided based on penetration testing or vulnerability scanning.

Aspect 4. The method of Aspect 1, wherein the new MUD file includes annotations identifying changes between the original MUD file and the new MUD file.

Aspect 5. The method of Aspect 1, wherein the new MUD file includes explanations for why the original MUD file should be updated.

Aspect 6. The method of Aspect 1, further comprising associating the updated MUD file with additional IoT devices that are identified in the updated MUD file as being associated with the updated MUD file.

Aspect 7. The method of Aspect 1, further comprising: determining the security data represents a security threat; and quarantining the IoT device until the original MUD file is updated to address the security threat.

Aspect 8. A network controller comprising: a storage configured to store instructions; and at least one processor configured to execute the instructions and cause the at least one processor to: receive an original MUD file provided by a manufacturer of an IoT device; receive behavior data and security data of the IoT device; prompt a generative model to create a new MUD file based on the behavior data and the security data; compare the new MUD file to the original MUD file; notify the manufacturer of an option to update the original MUD file to the new MUD file; receive, from the manufacturer, authorization to update the original MUD file to an updated MUD file; and associate the updated MUD file with the IoT device.

Aspect 9. The network controller of Aspect 8, wherein the behavior data includes data sent or received by the IoT device, protocols used by the IoT device, and ports accessed by the IoT device.

Aspect 10. The network controller of Aspect 8, wherein the security data includes reports provided based on penetration testing or vulnerability scanning.

Aspect 11. The network controller of Aspect 8, wherein the new MUD file includes annotations identifying changes between the original MUD file and the new MUD file.

Aspect 12. The network controller of Aspect 8, wherein the new MUD file includes explanations for why the original MUD file should be updated.

Aspect 13. The network controller of Aspect 8, wherein the at least one processor is configured to execute the instructions and further cause the at least one processor to associate the updated MUD file with additional IoT devices that are identified in the updated MUD file as being associated with the updated MUD file.

Aspect 14. The network controller of Aspect 8, wherein the at least one processor is configured to execute the instructions and further cause the at least one processor to: determine the security data represents a security threat; and quarantine the IoT device until the original MUD file is updated to address the security threat.

Aspect 15. A non-transitory computer-readable storage medium including instructions that, when executed by at least one processor, cause the at least one processor to: receive an original MUD file provided by a manufacturer of an IoT device; receive behavior data and security data of the IoT device; prompt a generative model to create a new MUD file based on the behavior data and the security data; compare the new MUD file to the original MUD file; notify the manufacturer of an option to update the original MUD file to the new MUD file; receive, from the manufacturer, authorization to update the original MUD file to an updated MUD file; and associate the updated MUD file with the IoT device.

Aspect 16. The non-transitory computer-readable storage medium of Aspect 15, wherein the behavior data includes data sent or received by the IoT device, protocols used by the IoT device, and ports accessed by the IoT device.

Aspect 17. The non-transitory computer-readable storage medium of Aspect 15, wherein the security data includes reports provided based on penetration testing or vulnerability scanning.

Aspect 18. The non-transitory computer-readable storage medium of Aspect 15, wherein the new MUD file includes annotations identifying changes between the original MUD file and the new MUD file.

Aspect 19. The non-transitory computer-readable storage medium of Aspect 15, wherein the new MUD file includes explanations for why the original MUD file should be updated.

Aspect 20. The non-transitory computer-readable storage medium of Aspect 15, wherein the instructions further cause the at least one processor to associate the updated MUD file with additional IoT devices that are identified in the updated MUD file as being associated with the updated MUD file.

What is claimed is:

1. A method comprising:
receiving an original manufacturer usage description file (original MUD file) provided by a manufacturer of an internet-of-things device (IoT device);

receiving behavior data and security data of the IoT device;
prompting a generative model to create a new MUD file based on the behavior data and the security data;
comparing the new MUD file to the original MUD file to obtain a comparison;
notifying the manufacturer of an option to update the original MUD file to the new MUD file based on the comparison indicating the original MUD file is out of date;
receiving, from the manufacturer, authorization to update the original MUD file to an updated MUD file; and
associating the updated MUD file with the IoT device.

2. The method of claim 1, wherein the behavior data includes data sent or received by the IoT device, protocols used by the IoT device, and ports accessed by the IoT device.

3. The method of claim 1, wherein the security data includes reports provided based on penetration testing or vulnerability scanning.

4. The method of claim 1, wherein the new MUD file includes annotations identifying changes between the original MUD file and the new MUD file.

5. The method of claim 1, wherein the new MUD file includes explanations for why the original MUD file should be updated.

6. The method of claim 1, further comprising associating the updated MUD file with additional IoT devices that are identified in the updated MUD file as being associated with the updated MUD file.

7. The method of claim 1, further comprising:
determining the security data represents a security threat; and
quarantining the IoT device until the original MUD file is updated to address the security threat.

8. A network controller comprising:
a storage configured to store instructions; and
at least one processor configured to execute the instructions and cause the at least one processor to:
receive an original manufacturer usage description file (original MUD file) provided by a manufacturer of an internet of things device (IoT device);
receive behavior data and security data of the IoT device;
prompt a generative model to create a new MUD file based on the behavior data and the security data;
compare the new MUD file to the original MUD file to obtain a comparison;
notify the manufacturer of an option to update the original MUD file to the new MUD file based on the comparison indicating the original MUD file is out of date;
receive, from the manufacturer, authorization to update the original MUD file to an updated MUD file; and
associate the updated MUD file with the IoT device.

9. The network controller of claim 8, wherein the behavior data includes data sent or received by the IoT device, protocols used by the IoT device, and ports accessed by the IoT device.

10. The network controller of claim 8, wherein the security data includes reports provided based on penetration testing or vulnerability scanning.

11. The network controller of claim 8, wherein the new MUD file includes annotations identifying changes between the original MUD file and the new MUD file.

12. The network controller of claim 8, wherein the new MUD file includes explanations for why the original MUD file should be updated.

13. The network controller of claim 8, wherein the at least one processor is configured to execute the instructions and further cause the at least one processor to associate the updated MUD file with additional IoT devices that are identified in the updated MUD file as being associated with the updated MUD file.

14. The network controller of claim 8, wherein the at least one processor is configured to execute the instructions and further cause the at least one processor to:

determine the security data represents a security threat; and quarantine the IoT device until the original MUD file is updated to address the security threat.

15. A non-transitory computer-readable storage medium including instructions that, when executed by at least one processor, cause the at least one processor to:

receive an original manufacturer usage description file (original MUD file) provided by a manufacturer of an internet of things device (IoT device);

receive behavior data and security data of the IoT device;

prompt a generative model to create a new MUD file based on the behavior data and the security data;

compare the new MUD file to the original MUD file to obtain a comparison;

notify the manufacturer of an option to update the original MUD file to the new MUD file based on the comparison indicating the original MUD file is out of date;

receive, from the manufacturer, authorization to update the original MUD file to an updated MUD file; and associate the updated MUD file with the IoT device.

16. The non-transitory computer-readable storage medium of claim 15, wherein the behavior data includes data sent or received by the IoT device, protocols used by the IoT device, and ports accessed by the IoT device.

17. The non-transitory computer-readable storage medium of claim 15, wherein the security data includes reports provided based on penetration testing or vulnerability scanning.

18. The non-transitory computer-readable storage medium of claim 15, wherein the new MUD file includes annotations identifying changes between the original MUD file and the new MUD file.

19. The non-transitory computer-readable storage medium of claim 15, wherein the new MUD file includes explanations for why the original MUD file should be updated.

20. The non-transitory computer-readable storage medium of claim 15, wherein the instructions further cause the at least one processor to associate the updated MUD file with additional IoT devices that are identified in the updated MUD file as being associated with the updated MUD file.

* * * * *